L. E. COWEY.
SPRING SUSPENSION OF MOTOR ROAD VEHICLES.
APPLICATION FILED FEB. 16, 1920.
1,377,980.  Patented May 10, 1921.
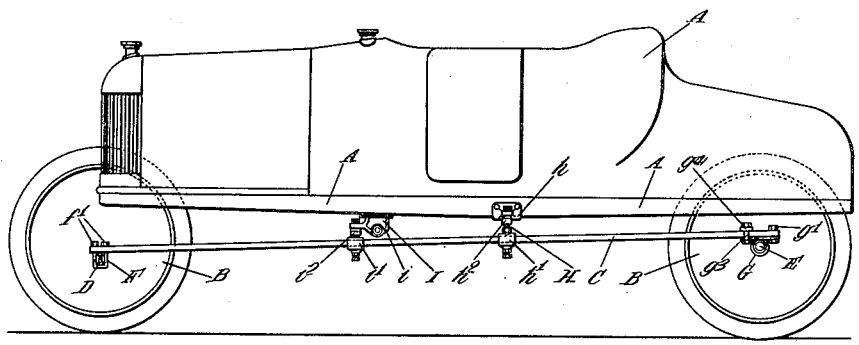
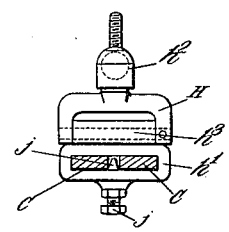
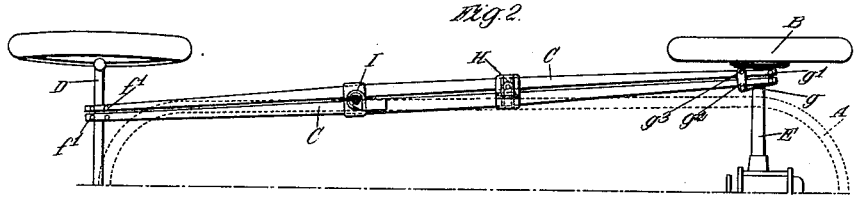
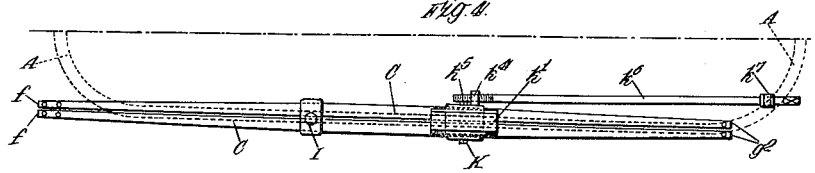

UNITED STATES PATENT OFFICE.

LEONARD EUGENE COWEY, OF KEW GARDENS, ENGLAND.

SPRING SUSPENSION OF MOTOR ROAD-VEHICLES.

1,377,980.  Specification of Letters Patent.  Patented May 10, 1921.

Application filed February 16, 1920. Serial No. 358,888.

*To all whom it may concern:*

Be it known that I, LEONARD EUGENE COWEY, a subject of the King of Great Britain, residing at Archer Works, Station avenue, Kew Gardens, in the county of Surrey, England, have invented certain new and useful Improvements in or Relating to the Spring Suspension of Motor Road-Vehicles, of which the following is a specification.

This invention relates to motor road vehicles of the kind in which the frame or chassis is resiliently supported by means of long leaf springs which are disposed on opposite sides of the frame or chassis with their extremities attached to the front and rear axles.

According to the present invention each spring is connected to the frame or chassis or to the front and rear axles respectively in such a manner as to permit of a limited amount of movement of the springs relatively to the frame or chassis or to the axles in a plane at right angles to their length.

As the strength of a leaf spring varies as the square of the thickness of the leaf and as the present invention allows of long leaf springs being employed, the springs can be of considerable thickness and strength without interfering with their resiliency. Each spring may be constituted by a single leaf spring (*i e.,* a non-laminated or solid bar) or, if desired the springs may be of the laminated type although the laminations can be fewer in number than usual.

In one form of the invention each spring may be connected to the frame or chassis of the vehicle at two points and one or both of the said connections may be of a pivotal character so as to allow freedom of movement in all planes, or alternatively one of the said connections may be in the form of a slide or roller bearing which permits of endwise movement of the spring relatively to the frame or chassis, as also a certain amount of movement in a plane at right angles to the length of the spring so as to allow twisting movements to be transmitted freely along the entire length of the spring. As a further alternative each spring may be constituted by a non-laminated or solid bar and be connected at one point in a rigid manner to the frame or chassis, the ends of each spring being connected in a non-rigid or flexible manner to the front and rear axles respectively. By connecting the springs to the body or chassis or to the axles in a non-rigid or flexible manner as and for the purpose aforesaid the resiliency of the long leaf springs and other advantages associated with their use are fully utilized, which would not be the case if the connections between the springs and the frame of the vehicle were of a rigid or non-flexible character.

In order that there may be little or no tendency to impart movement to the front or steering axle of the vehicle the aforesaid sliding connection is preferably disposed on the frame at the rear point of connection so that the lengthening of the spring consequent on the flattening which occurs during oscillation of the vehicle will impart movement mainly to the rear axle which is capable of effecting slight endwise movements in the usual manner. Alternatively the rear pivotal connection may comprise a ball and socket connection and also a transverse pivotal connection which allows of endwise movement of the spring. Owing to this arrangement the spring is free to move in all planes in addition to endwise movement.

In order that the said invention may be clearly understood and readily carried into effect the same will now be described more fully with reference to the accompanying drawing in which—

Figure 1 is a partly diagrammatic elevation of a light car fitted with one constructional form of the invention.

Fig. 2 is a half plan view of Fig. 1, the frame of the car being shown in dotted lines.

Fig. 3 is a part sectional end view of one of the rear supporting devices by means of which the springs are connected to the frame of the vehicle.

Fig. 4 is a plan of a modified form of the invention, and

Fig. 5 is a sectional end view of the rear supporting device shown at Fig. 4.

A is a body of the vehicle and B, B, are the road wheels thereof. C, C, are the long leaf springs which are tapered (in plan) toward each of their extremities and which are mounted together in pairs and disposed on opposite sides of the vehicle with their extremities attached respectively to the front axle D and the rear axle E. In the example shown the front end of each spring is connected to the axle D by means of a U-shaped member F, which is located around the axle D and the ends of which pass through openings $f$, $f$ in the spring, the parts being secured together by nuts $f'$, $f'$. The rear ends of each pair of leaf springs are connected to the rear axle E by a sleeve G located around the axle and having a flanged upper part $g$ which is of triangular configuration in plan (Fig. 2), upon which the leaf springs C, C rest and to which they are secured at their extremities by bolts and nuts $g'$ which pass through openings $g^2$ in the springs. An additional pair of bolts and nuts $g^3$, $g^3$ are also provided which pass through the part $g$ and also through a plate $g^4$ located above the springs, the sides of the bolts abutting against, but not passing through, the leaf springs.

In the embodiment of the invention shown at Fig. 1 the leaf springs C, C are attached to the frame of the vehicle by means of a rear suspension device H, and a front suspension device I. The rear suspension device H comprises a bracket $h$ secured to the frame of the vehicle from which a collar $h'$ which encircles the leaf springs C, C is pivotally suspended through the intermediary of a ball and socket connection $h^2$, and a transverse pivotal connection $h^3$. The front suspension device I comprises a bracket $i$ from which a collar $i'$ which encircles the pair of leaf springs C, C is pivotally suspended through the intermediary of a ball and socket connection $i^2$. Owing to the provision of the ball and socket connections $h^2$ and $i^2$ the leaf springs are free to move in all planes, while the slight amount of endwise movement which is necessary is permitted by means of the transverse pivotal connection $h^3$. Each of the collars $h'$ and $i'$ is provided with a screw J having a conical nose $j$ which is located between the springs C, C and which can be adjusted as desired to retain the springs rigidly in place within the collars $h'$ and $i'$.

In the modified arrangement shown at Figs. 4 and 5 the front pivotal connection I is similar to that shown at Figs. 1 and 2 but the rear connection is in the form of a slide K which is capable of being adjusted if desired so as to change the position of the rear fulcrum and thus alter the strength of the spring to suit different classes of vehicles or different loads on the same vehicle. In the example shown the slide K has an undercut part $k$ which engages a dovetailed slide $k'$ attached to the frame A of the vehicle. In the lower part $k^2$ of the slide K the blade springs C, C are mounted and held loosely or flexibly in place by means of a roller $k^3$. At one side of the slide K an internally screw threaded eye $k^4$ is provided which engages a screw threaded part $k^5$ of a rod $k^6$ carried by a support $k^7$ attached to the frame of the vehicle. Owing to this arrangement and by rotating the screw $k^5$ it will be clear that a slide K is capable of a limited amount of endwise movement relatively to the frame of the vehicle.

The springs instead of being constituted by a single length of metal may also be made in lengths or sections connected together in any suitable manner.

Owing to the fact that the axles are connected together through the intermediary of a resilient connection the shock-load which may be applied to one wheel is taken up by practically the full length of the spring or springs on that side of the vehicle, while in the case of a load applied at one end of the chassis the other end of the chassis is depressed to a suitable extent, thus spreading the load over the full length of the springs. As the springs are preferably attached in a rigid manner to the axles and pivotally connected to the frame or chassis great lateral stability is secured, while owing to the thickness of the metal at the points at which the springs are connected to the axles the usual radius and torque rods can be dispensed with, at least in the case of light cars. The springs are preferably of the inverted leaf variety and may be of very large camber, the arrangement being preferably such, however, that when the weight of the vehicle is on the springs, the camber is approximately flattened out.

In order to prevent undue freedom of the springs, any suitable clamping device may be inserted between them and the frame.

What I claim and desire to secure by Letters Patent of the United States is:—

1. In a motor road vehicle the combination with a chassis, of continuous long springs disposed on opposite sides of the chassis, means attaching one end of each of said springs to the front axle, means attaching the other end of each of said springs to the rear axle, and means connecting each of said springs between the ends thereof to the chassis at two points permitting a relative universal movement between said springs and said chassis.

2. In a motor road vehicle the combination with a chassis, of continuous long springs disposed on opposite sides of the chassis, means attaching one end of each of said springs to the front axle, means attaching the other end of each of said springs to the rear axle, and means connecting said springs between the ends thereof to the chassis at two points in a non-rigid or flexible manner, said connections to the chassis being so constructed as to allow freedom of movement in all planes.

3. In a motor road vehicle the combination with a chassis, of continuous long springs disposed on opposite sides of the chassis, means attaching one end of each of said springs to the front axle, means attaching the other end of each of said springs to the rear axle, and means connecting each of said springs to the chassis at two points in a non-rigid or flexible manner, one of said connections to the chassis being of such character as to permit endwise movement of the springs relatively to the chassis.

4. In a motor vehicle the combination with a chassis, of two long leaf springs each constituted by a continuous non-laminated or solid bar, said springs being disposed on opposite sides of the chassis, means attaching one end of each of said springs to the front axle, means attaching the other end of each of said springs to the rear axle, and means attaching each spring between the ends thereof to the chassis, said attaching means permitting a relative universal movement between said chassis and said springs.

5. In a motor road vehicle the combination with a chassis of long springs disposed on opposite sides of the chassis, means attaching one end of each of said springs to the front axle, means attaching the other end of each of said springs to the rear axle, means connecting each of said springs between the ends thereof to the chassis at two points in a non-rigid or flexible manner, and means for adjusting the position of the rear connection to the chassis so as to alter the strength of the springs to suit different classes of vehicles or different loads on the same vehicle.

6. In a motor road vehicle the combination with a chassis, of long springs disposed on opposite sides of the chassis, means attaching one end of each of said springs to the front axle, means attaching the other end of each of said springs to the rear axle, means for connecting said springs between the ends thereof to the chassis at two points in a non-rigid or flexible manner, said connections to the chassis being so constructed as to allow freedom of movement in all planes, and means for adjusting the position of the rear connection to the chassis so as to alter the strength of the springs, to suit different classes of vehicles or different loads on the same vehicle.

7. In a motor road vehicle the combination with a chassis, of long springs disposed on opposite sides of the chassis, means attaching one end of each of said springs to the front axle, means attaching the other end of each of said springs to the rear axle, means connecting each of said springs to the chassis at two points in a non-rigid or flexible manner, one of said connections to the chassis being of such a character as to permit endwise movement of the springs relatively to the chassis, and means for adjusting the position of the rear connection to the chassis so as to alter the strength of the springs to suit different classes of vehicles or different loads on the same vehicle.

8. In a motor vehicle the combination with a chassis, of long leaf springs each constituted by a continuous non-laminated or solid bar, said springs being disposed on opposite sides of the chassis, means attaching one end of each of said springs to the front axle, means attaching the other end of each of said springs to the rear axle, means attaching each spring between the ends thereof to the chassis, said attachments including non-rigid or flexible connecting means, and means for adjusting the position of the fulcrum of each spring so as to alter the strength of the springs to suit different classes of vehicles or different loads on the same vehicle.

LEONARD EUGENE COWEY.